US006822713B1

(12) United States Patent
Yaroshchuk et al.

(10) Patent No.: US 6,822,713 B1
(45) Date of Patent: Nov. 23, 2004

(54) OPTICAL COMPENSATION FILM FOR LIQUID CRYSTAL DISPLAY

(75) Inventors: Oleg Yaroshchuk, Kyiv (UA); Yuriy Reznikov, Kyiv (UA); Jack R. Kelly, Stow, OH (US); Liang-Chy Chien, Stow, OH (US); Tatiana Sergan, Silver Lake, OH (US)

(73) Assignee: Kent State University, Kent, OH (US)

( * ) Notice: Subject to any disclaimer, the term of this patent is extended or adjusted under 35 U.S.C. 154(b) by 285 days.

(21) Appl. No.: 09/722,991

(22) Filed: Nov. 27, 2000

(51) Int. Cl.[7] ................................................. G02F 1/13

(52) U.S. Cl. ..................................................... 349/117

(58) Field of Search ................................ 349/117, 118, 349/119

(56) References Cited

U.S. PATENT DOCUMENTS

| | | | | | |
|---|---|---|---|---|---|
| 4,810,433 | A | * | 3/1989 | Takayanagi et al. | 264/435 |
| 5,389,698 | A | * | 2/1995 | Chigrinov et al. | 522/2 |
| 5,784,139 | A | * | 7/1998 | Chigrinov et al. | 349/117 |
| 5,818,615 | A | * | 10/1998 | Abileah et al. | 349/117 |
| 5,838,407 | A | * | 11/1998 | Chigrinov et al. | 349/117 |
| 6,061,113 | A | * | 5/2000 | Kawata | 349/117 |

OTHER PUBLICATIONS

Manfred Eich, et al., "Laser–Induced Gratings and Spectroscopy in Mondomains of Liquid Crystalline Polymers," J. Opt. Soc. Am., Optical Society of America, vol. 7 (No. 8), p. 1429–1436, (Aug. 1990).

Z. Sekkat et al., "Photoinduced Orientation of Azo Dyes in Polymeric Films Characterization of Molecular Angular Mobiltiy," Synthetic Metals, Elsevier Sequoia, p. 373–381, (1993).

Dong–Hae Suh, et al., "Photocontrol of Alignment of a Nematic Liquid Crystal," Macromol, Chem. Phys, Hiithig & Wepf Verlag Zug, p. 375–381, (1998).

J. Stumpe, et al., "Photo–Orientation in Amorphous and Aligned Films of Photochromic Liquid Crystalline Polymers," Thin Solid Films, p. 252–256, (1996).

J. Chen, et al., "Model of Liquid Crystal Alignment by Exposure to Linearly Polarized Ultraviolet Light," Physical Review E, The American Physical Society, vol. 54 (No. 2), p. 1599–1603, (1996).

Yuriy Reznikov, et al., "Relationship Between Molecular Structure of Photosensitive Fragments of Aligning Properties of Polysiloxanes," Mol. Materials, Gordon and Breach Science Publishers, p. 333–342, (1998).

M. Nishikawa, et al., "Mechanism of Unidirectional Liquid–Crystal Alignment on Polyimidies with Linearly Polarized Ultraviolet Light Exposure," Applied Physics Letters, American Institute of Physics, vol. 72 (No. 19), p. 2403–2405, (May 11, 1998).

N. C. R. Holme, et al., "Photoinduced Anisotropy Measurements in Liquid–Crystalline Azobenzene Side–Chain Polyesters," Applied Optics, vol. 35 (No. 23), p. 4622–4627, (Aug. 10, 1996).

Axel Bohme, "Liquid–Craystalline Side Group Polyesters with Definite Lengths of Flexible Spacers in the Main Chain," Makromol. Chem., Huthig & Wepg Verlag, p. 3341–3348.

(List continued on next page.)

*Primary Examiner*—James A. Dudek
(74) *Attorney, Agent, or Firm*—Scott M. Oldham; Hahn Loeser + Parks LLP

(57) ABSTRACT

An optical compensation film for a liquid crystal display is provided wherein the film is a polymer that is capable of producing light induced anisotropy. The film is irradiated with light to form an optical axis or axes.

11 Claims, 10 Drawing Sheets-

OTHER PUBLICATIONS

P. Uznanski, "Polarized Absorption Spectroscopy of Trans-Azobenzene and Trans-Stilbene in Stretched Polyethlene Films," Specrtrochimica Acta., Pergamon Press plc, vol. 46A (No. 1), p. 23–27, (1990).

Derwent WPI Publication, Accession NO. 97–068695/199707; English language translation of JP 8313729 (Nov. 29, 1996).

Hiroyuki Mori, et al., "Application of a Negative Birefringence Films to Various LCD Moldes," Proc. IDRC, p. M88–M97, (1997).

T. Toyooka, et al., "Optical Design for Wide–Viewing–Angle TN–LCD with Hybrid Aligned Nematic Compensation Films," SID 98 Digest, p. 698–701, 1998).

J. Chen, et al., "Wide–Viewing–Angle Photoaligned Plastic Films for TN–LCDs," SID 99 Digest, p. 98–99, (1999).

T. Yamada, et al., "Novel Optical Compensatin Film Using Discotic Compound," IDW '96, p. 349–352, (1996).

Hidetoshi Tomita, et al., "Photoregulation of Liquid Crystal Alignment by Cinnamoyl Residues on a Silica Surface," Liquid Crystals, Taylor & Francis Ltd., vol. 20 (No. 2), p. 171–176, (1996).

Martin Schadt, et al., "Surface–Induced Parallel Alignment of Liquid Crystals by Linearly Polymerized Photopolymers," Jpn. J. Appl. Phys., vol. 31 (No. I–7), p. 2155–2164, (Jul. 1992).

Dyadyusha, A., et al., Ukr.Fiz. Zhurn, 1991, 36, 1059 (in Russian); English language summary, p. 1062.

Schadt, Martin et al., *Photo–Generation of Linearly Polymerized Liquid Crystal Aligning Layers Comprising Novel, Integrated Optically Patterned Retarders and Color Filters*, Jpn. J. Appl. Phys., vol. 34 (1995) pp. 3240–3249.

Weisner, Ulrich et al., *An Infrared Spectroscopic Study of Photo–Induced Reorientation in Dye Containing Liquid–Crystalline Polymers*, Liquid Crystals, vol. 11, No. 2 (1992) pp. 251–267.

Benecke, Carsten et al., *Determination of Director Distributions in Liquid Crystal Polymer–Films by Means of Genralized Anistropic Ellipsometry*, Jpn. J. Appl. Phys., vol. 39 (2000) pp. 525–531.

Chen, J. et al., *Wide–Viewing–Angle Photoaligned Plastic Films for TN–LCD's*, SID 99 Digest, (1999) pp. 98–101.

* cited by examiner

OPTICAL COMPENSATION FILM FOR LIQUID CRYSTAL DISPLAY

FIELD OF THE INVENTION

The present invention is directed to optical compensation films for liquid crystal displays. More particularly, the invention is directed to optical compensation films formed from polymers that have been irradiated by light.

BACKGROUND OF THE INVENTION

Compensation films are an indispensable component of modern liquid crystal displays (LCDs). Compensation films, for example, can compensate the color background of super-twisted nematic LCDs, and can expand the viewing angle of twisted nematic LCDs. The main idea of the optical compensation film (OCF) design is to make the optical symmetry of the compensator more closely resemble that of the director distribution in the liquid crystal layer in the selected state. Therefore, certain parameters of the OCF are determined by the type of LCD mode.

Both negative and positive compensation films, with optics axes oriented in-plane, tilted and normal to the plane of the film, have been developed. In order to adjust more precisely to the director distribution in the liquid crystal (LC) cell, in the modern OCF, the optical axis that is modulated over the film thickness or structure of the OCF is biaxial. Alternatively, a stack of uniaxial films with different directions of optical axis could be used.

Conventional optical compensation films are produced from polymer materials. The OCFs in general use are stretched polycarbonate, yielding negative retardation, and polystyrene, yielding positive retardation, films. These compensators have almost the same wavelength dispersion as that of the liquid crystals and the compensators have high optical anisotropy. The main drawback of stretched films is that it is rather difficult to produce the uniform retardation over a large area and to control the optical axis direction.

Another approach is the use of polymer liquid crystalline films. Cholesteric polymer films are used for the color compensation of LCDs. Discotic compound films expand viewing angle of LCDs. Discotic films possess high negative birefringence and have similar orientation structure to that of the on-state LCD. Uniform alignment of LC layers is usually induced with aligning substrates or external field. The obtained structure is usually fixed by photo-crosslinking or polymerization process. The main problems of the application of liquid crystalline films are the complication of their alignment and high commercial cost.

What is needed in the art is a method of fabricating an optical compensation film wherein the alignment in the film is reached without stretching, application of electric and/or magnetic fields, or special treatment of the aligning substrates, and which can form a uniform retardation over a large area.

It is therefore an object of the invention to provide a method of fabricating an optical compensation film for a liquid crystal display without stretching, application of an electric and/or magnetic field, or special treatment of the aligning substrates.

SUMMARY OF THE INVENTION

The present invention provides an optical compensation film for a liquid crystal display comprising a polymer capable of producing light induced anisotropy characterized in that the polymer has been irradiated with light to form at least one optical axis.

The present invention also provides a method of making an optical compensation film comprising: providing a substrate; disposing a polymer in a solvent on the substrate; removing the solvent to form a polymer film; and irradiating the polymer with light, wherein at least one optical axis is formed in the polymer film.

The present invention also provides a method of making a liquid crystal display cell containing an optical compensation film comprising: providing two opposed substrates, disposing the optical compensation film on at least one of the substrates on a surface of the substrate that faces the other substrate, irradiating the optical compensation film with light, disposing electrodes at one of i) on the substrate prior to disposing the optical compensation film, and ii) on the optical compensation film, disposing a liquid crystal between the substrates, and sealing the substrates together, wherein at least one optical axis is formed in the polymer film.

DETAILED DESCRIPTION OF THE INVENTION

The present invention provides an optical compensation film for a liquid crystal display. The optical compensation film is an organic material capable of producing light induced anisotropy. The film is irradiated with light to form an optical axis.

Classes of materials that can function as the optical compensation film in the present invention include, but are not limited to, photosensitive polymers, such as polyimides; methacrylates; acrylates; vinyls; vinyl ethers; siloxanes; styrene; epoxy polymers containing azobenzene, stilbene, cinnamate, maleimide, or coumarin functional groups in the side and/or main polymer chain; and mixtures thereof.

Specific polymers that can function as the optical compensation film in the present invention include, but are not limited to, comb polymers containing azobenzene or cinnamate derivatives in the side chain.

The average molecular weight of the polymers of the present invention range from about 10,000 to about 300,000. The preferred molecular weight is dependent upon the specific polymer selected. As used throughout this specification, the molecular weight is weight average molecular weight.

Figure 10:
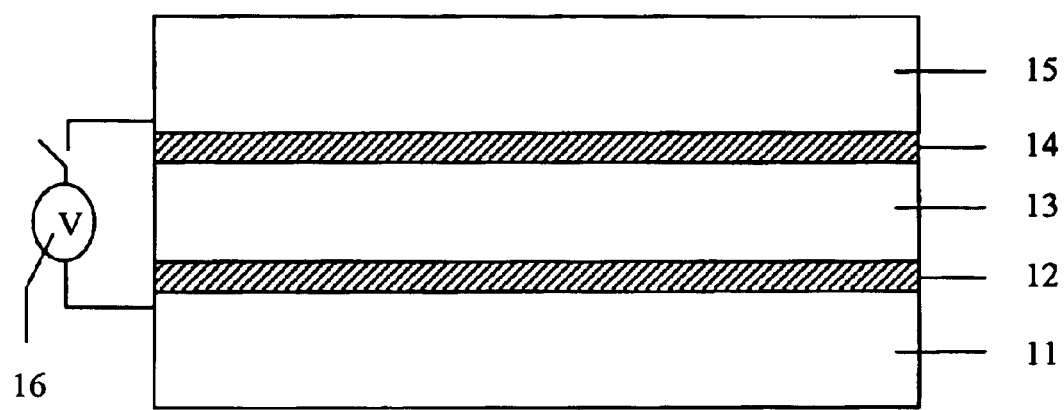
FIG. 10 is a schematic of a liquid crystal cell.

The optical compensation film can then be incorporated into a liquid crystal cell. A liquid crystal cell typically comprises opposed substrates, electrodes on the substrates, an optical compensations film disposed over at least one of the electrodes, spacers between the substrates to control the thickness of the liquid crystal cell, and liquid crystals disposed between the substrates. FIG. 10 is a schematic of a typical liquid crystal cell. Layers 11 and 15 represent the combined substrate and electrodes. Layers 12 and 14 represent the optical compensation films. Layer 13 represents the liquid crystal material. And, layer 16 is a voltage source to power the cell.

The substrate can be any material commonly used for fabricating liquid crystal cells. Materials such as glass, quartz or plastic can be used. The substrate materials can also be any materials commonly used for fabricating chips, for example silicon.

The electrodes of the liquid crystal cell can be fabricated from any material known to be used for electrodes for liquid crystal cells. Suitable materials for the electrodes include, but are not limited to, indium-tin-oxide (ITO), stannic oxide $SnO_2$, aluminum, chromium, silver, or gold.

Specific Embodiments of the Invention

As material for retardation films we used azopolymers and cinnamates. Structural formulae of the used polymers are shown in FIG. 1. Both materials were comb-like polymers with azobenzene fragments in the side chains connected by flexible alkyl spacers to the polymer backbone. Side chains of the azopolymer 1 (FIG. 1A) contained polar $NO_2$ groups. The side chains in azopolymer 2 (FIG. 1B) have hydrophobic alkyl groups [[$C_6H_{13}$]] $OC_4H_9$ attached to the azobenzene moiety. The difference in the chemical structure of the side chains was expected to influence the difference in the supramolecular structure of azobenzene moieties. Due to flexibility of alkyl spacers, the azobenzene fragments could rotate relatively freely in the polymer matrix. Since their concentration in the polymer was high enough, they could form mesophases within some temperature intervals.

Azobenzene fragments of azpolymer 1 (FIG. 1A) formed smectic A and nematic mesophases within the temperature range 44°–52° C. and 52°–55° C., respectively. The azopolymer 2 (FIG. 1B) demonstrated a reentrant nematic mesophase within the temperature interval 112°–140° C. Both cinnamates were amorphous polymers. All polymers were solids at room temperature. The molecular weight of azopolymer 1 was about 13,500, and the molecular weight of azopolymer 2 was about 36,000.

The azopolymer films were fabricated by a spin coating technique. Azopolymer 1 and azopolymer 2 were dissolved in toluene and dichloroethane, respectively, up to concentrations of 10% by weight. The solutions were spin coated on glass substrates at spinning speeds of 1500–3000 rpm. The thickness of the films was measured with a profilometer manufactured by Tencor Instruments.

To induce the anisotropy in the samples of azopolymers, we used the light of a Xe lamp from Oriel Corp. The density of polarized irradiation used in the experiments was 11 $mW/cm^2$ in the wavelength range of 326–400 nm. UV light was polarized using dichroic UV polarizer supplied by Oriel Corporation and operable in the wavelength range of 230–770 nm.

The main photochemical reaction in azopolymers was trans-cis isomerization, whereas in cinnamate polymers it was (2+2') photocycloaddition of cinnamoyl units. The photoinduced anisotropy in polymers results from the light induced orientational ordering of photosensitive fragments and products of photochemical reaction.

Figure 1A:
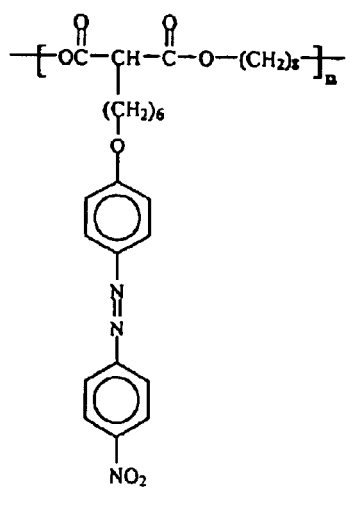
FIG. 1 shows structural formula of the polymers used in our examples.
Figure 1B:
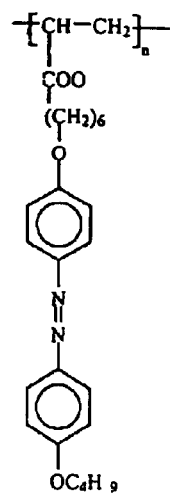
Figure 1C:
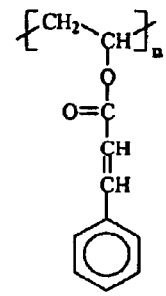
Figure 1D:
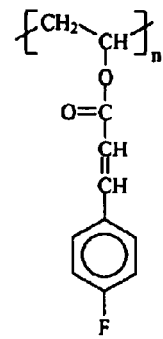
Figure 2:
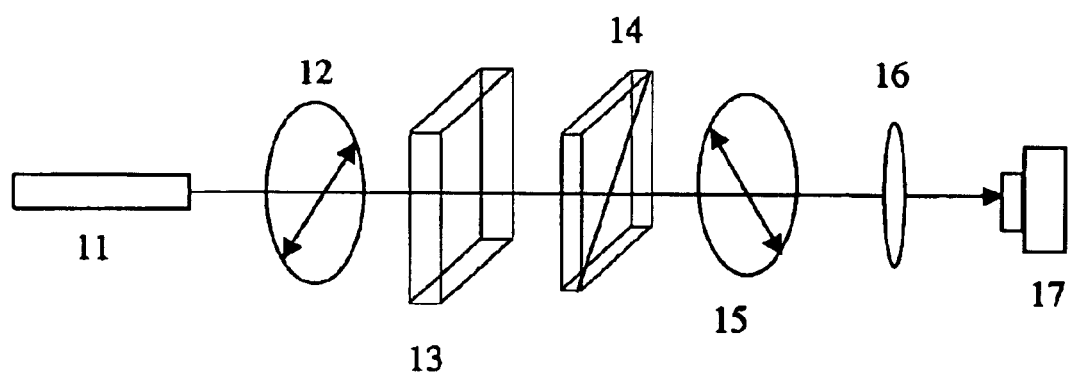
FIG. 2 is a scheme of the ellipsometry set up.
Figure 9:
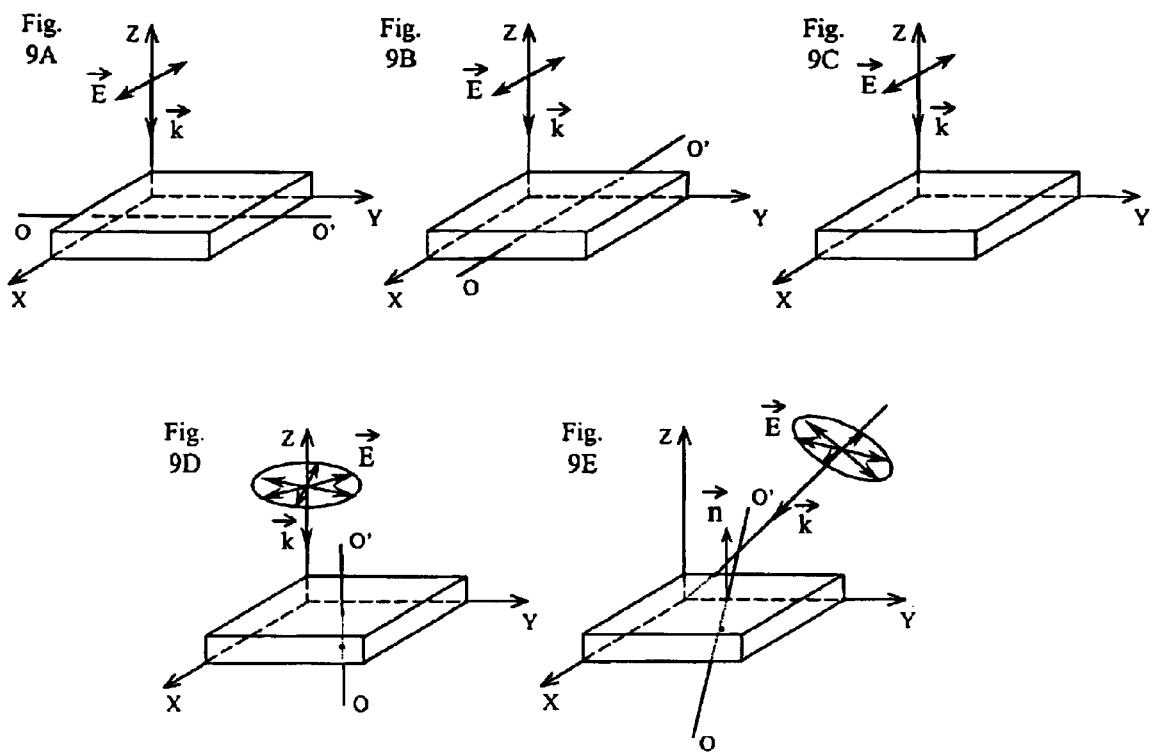
FIG. 9 shows irradiation schemes and induced orientational structures for positive A plate ($n_y > n_x = n_z$), B) negative A plate ($n_x < n_y = n_z$), C) biaxial film ($n_x \neq n_y \neq n_z$), D) positive C plate ($n_z > n_x = n_y$), E) positive O plate.

To measure the light induced birefringence in polymer films, we used a transmission ellipsometry technique with fixed positions of a polarizer, quarter wave compensation plate and rotated analyzer (FIG. 2). The quarter wave plate converts the elliptically polarized light passing through the sample into linearly polarized light. The rotation angle of the polarization plane of testing light after phase plate could be found by rotation of the analyzer to a position of minimum light transmission at an angle φ. Let us assume that principle dielectric axes of the film, x, y, and z, are oriented as it is shown in FIG. 9. In case of oblique light incidence, the angle φ depends on the in-plane retardation $(n_y-n_x)d$, the out-of-plane retardation $(n_z-n_x)d$ and the absolute value of one of the refractive indices of the biaxial film, for example, $n_x$ (d and λ are film thickness and light wavelength, respectively). The angle φ was calculated as a function of light incidence angles θ of the testing beam assuming a certain sample configuration. Such calculations were carried out using Berreman's 4×4 matrix method. The experimental curves φ(θ) were fitted with the theoretical one. The absolute value of the refractive index measured by Abbe refractometer was used in the fitting process.

The setup included a low power He—Ne laser (λ=632.8 nm), two calcite Glan-Thompson polarizers mounted on rotational stages from Oriel Corp., a Babinet-Soleil compensator adjusted to produce the same retardation as a quarter wave plate for the light wavelength of λ=632.8 nm and a sample holder mounted on the rotational stage by Oriel Co. The light intensity was measured with a photodiode connected to a Keithley Instuments multimeter. The setup was automatically controlled by a personal computer. The rotation accuracy was better than 0.2°.

In FIG. 2, a helium neon laser (11) acts as a light source. The light generated passes through polarizer (12), sample (13), quarter wave plate (14), analyzer on rotational stage (15), and lens (16), before reaching detector (17).

The examples below illustrate abilities of this technique for the investigation of spatial orientational structures in the polymers used.

Films of azopolymer 1.

Figures 3A, 3B:
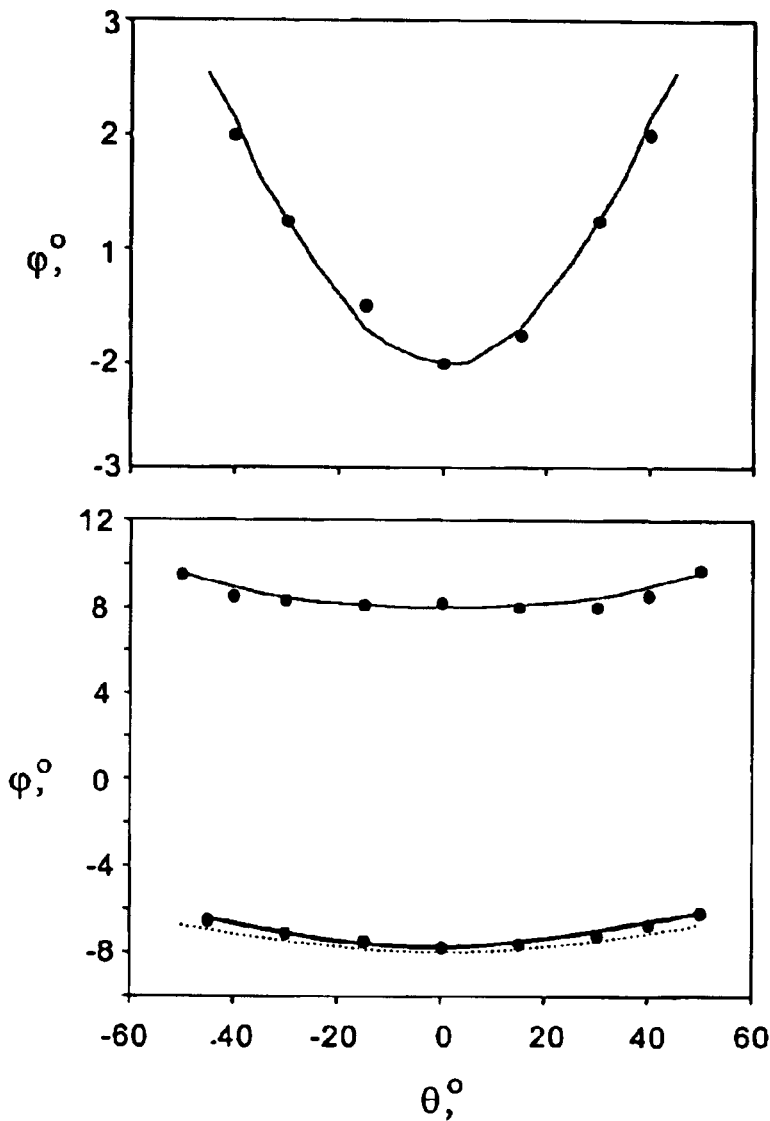
FIGS. 3A and 3B are $\phi(\theta)$ graphs for the azopolymer 1 (FIG. 1$a$) film before (FIG. 3A) and after (FIG. 3B) irradiation with polarized UV light.

The φ versus θ curves for azopolymer 1 (FIG. 1a) before and after irradiation are presented in FIG. 3a and FIG. 3b, respectively. In case of the non-irradiated film there was no phase shift for normal light incidence (θ=0). This indicated equality of the two in-plane indices: $n_y=n_x$. The film possessed out of plane birefringence $(n_z-n_x)d=40$ nm that caused a phase shift at oblique light incidence. Curve fitting gave the out-of-plane index $n_z$ as smaller than the two in-plane indices: $n_{z-n} <_{nx}=n_y$ and $n_z-n_x\sim-0.08$. The film showed negative birefringence with the optic axis perpendicular to the film surface (negative C film). The relationship between the three indices suggests that the azobenzene fragments are randomly distributed in the plane of the film with no preferred direction for their orientation (a degenerate in-plane distribution).

FIG. 3b show the curves φ(θ) measured after 15 min of UV light irradiation with the intensity of 20 $mW/cm^2$.

Curves 1 and 2 correspond to vertical and horizontal azimuths of actinic UV light polarization, respectively. According to the modeling, positive phase shift corresponds to the axis in the horizontal direction having the higher in-plane refractive index $n_y$ perpendicular to UV light polarization and the lower in-plane index $n_x$. Curve fitting for this case gave the following relationship between the three refractive indices: $n_y - n_x = 0.3$ $((n_y - n_x)d \approx 30$ nm$)$, $(n_z - n_z)d = 0$ nm, $n_y > n_x = n_z$. The light induced structure was positive uniaxial with the optic axis perpendicular to the UV light polarization. In this case, the azobenzene fragments showed planar alignment perpendicular to the UV light polarization.

Figure 4:
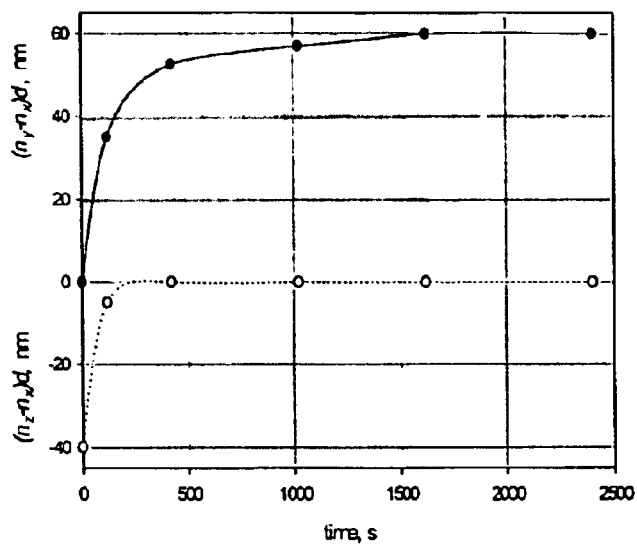
FIG. 4 is a graph of birefringence kinetics in azopolymer 1 (FIG. 1$b$) under polarized UV light irradiation.

We studied kinetics of orientation of azobenzene fragments under polarized UV light irradiation with a tight intensity of 20 mW/cm². Birefringence measurements were taken at the same irradiation site after successive periods of irradiation. The time between the finish of each irradiation step and taking the birefringence measurement was long enough to reach equilibrium. FIG. 4 shows the measured values of induced in-plane and out-of-plane optical retardation $n_y - n_x)d$ and $n_z - n_x)d$, respectively, versus time of irradiation. Before the UV light was applied, the azobenzene fragments were distributed uniformly in the plane of the film $(n_z < n_x = n_y)$. The irradiation of azopolymer 1 redistributed the fragments in the plane of the film such that they aligned perpendicular to the direction of UV light polarization. This process increased the difference between two in-plane refractive indices. At the photosteady state, the film was a positive uniaxial medium with the in-plane optic axis perpendicular to the UV light polarization $n_y > n_x = n_z$. The value of induced birefringence $n_y - n_x$ was higher than 0.25. At the intermediate stages of irradiation the biaxial structures were detected.

Films of azopolymer 2.

Figures 5A, 5B:
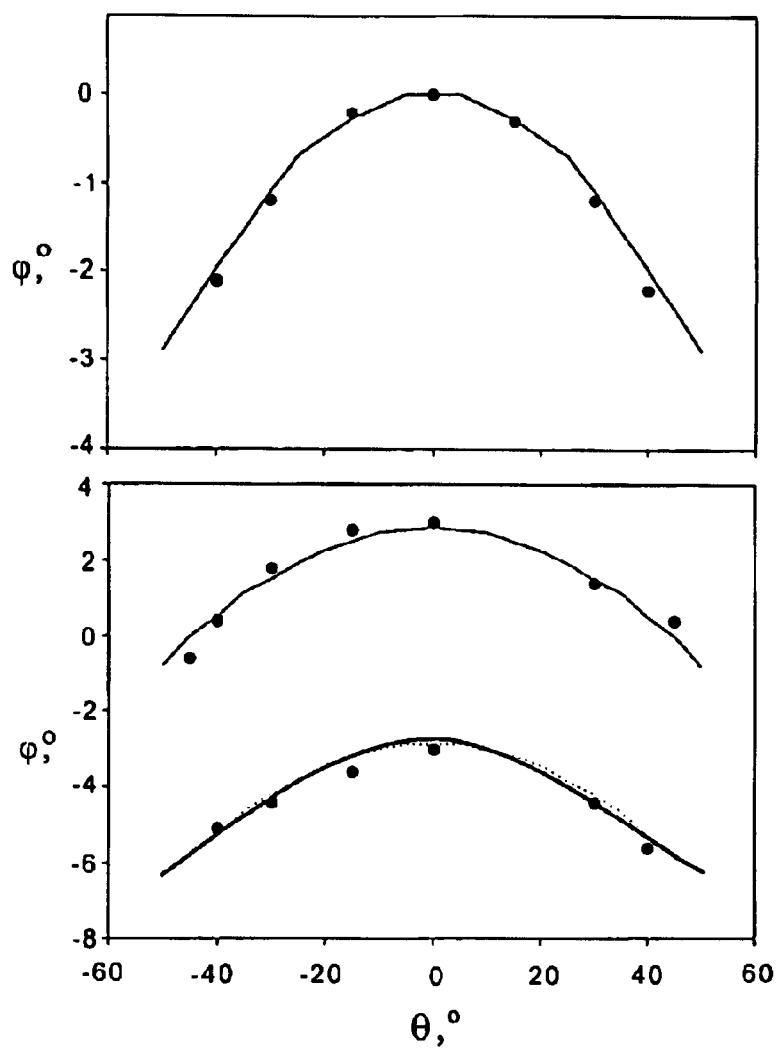
FIGS. 5A and 5B are $\phi(\theta)$ graphs for the azopolymer 2 (FIG. 1$b$) film before (FIG. 5A) and after (FIG. 5B) irradiation with polarized UV light.

The $\phi$ versus $\theta$ curves for azopolymer 2 (FIG. 1$b$) before and after 15 min irradiation are presented in FIG. 5A and FIG. 5B, respectively. Similar to the azopolymer 1, the in-plane birefringence was negligibly small $n_y - n_x \approx 0$. At the same time, the film was characterized by positive out-of-plane birefringence: $(n_z - n_x)d = 35$ nm $(n_z - n_x \sim 0.085)$ and $n_z > n_x = n_y$. So the film of the azopolymer 2 was a positive uniaxial medium with the optic axis normal to the film surface.

For film of azopolymer 2, similar to the film of azopolymer 1, the higher index $n_y$ was perpendicular to the direction of UV light polarization. However, the relationship between the three principal indices is different: $n_y - n_x \approx 0.025$ $((n_y - n_x)d \approx 10$ nm$)$ and $n_z - n_x \approx 0.12$ $((n_z - n_x)d = 50$ nm$)$, $n_z > n_y > n_x$. Without being limited to theory, this suggests a biaxial structure characterized by the fan-like distribution of the azo-benzene fragments in the plane that is perpendicular to the direction of light polarization.

Figure 6:
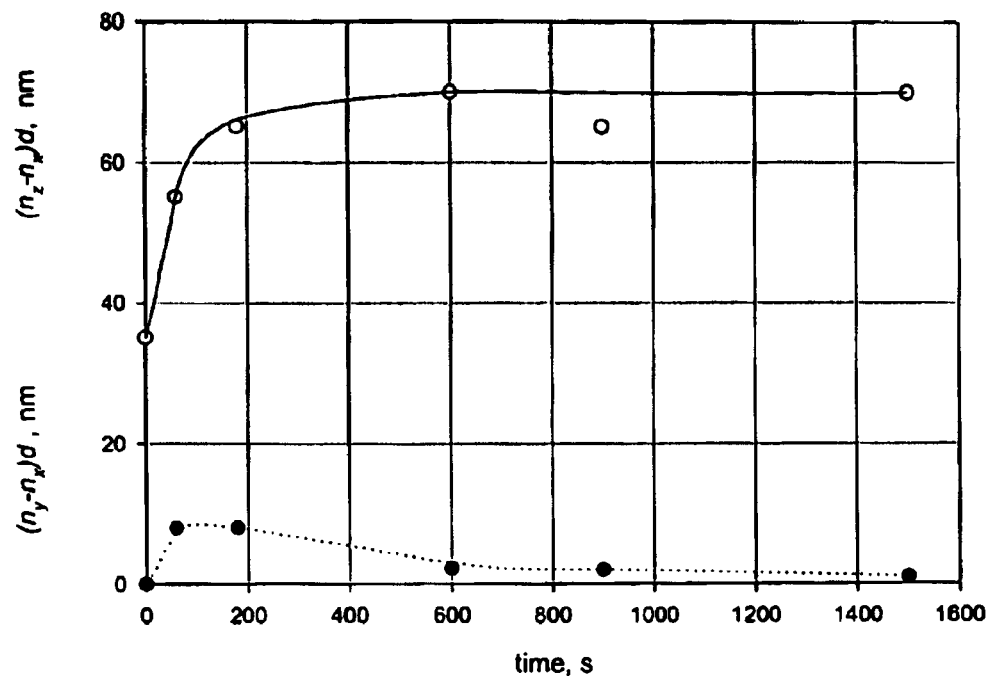
FIG. 6 is a graph of birefringence kinetics in azopolymer 2 under polarized UV light irradiation.

Dependencies of $(n_y - n_x)d$ and $(n_z - n_x)d$ versus time of irradiation are presented in FIG. 6. Increase of irradiation dose led to non-monotonous change of the in-plane birefringence $n_y - n_x$. Simultaneously, the out-of-plane birefringence $n_z - n_x$ increased to 0.3 $((n_z - n_x)d = 70$ nm$)$. The photosteady state was characterized by the high ordered uniaxial homeotropic alignment of the azobenzene fragments.

Figure 7:
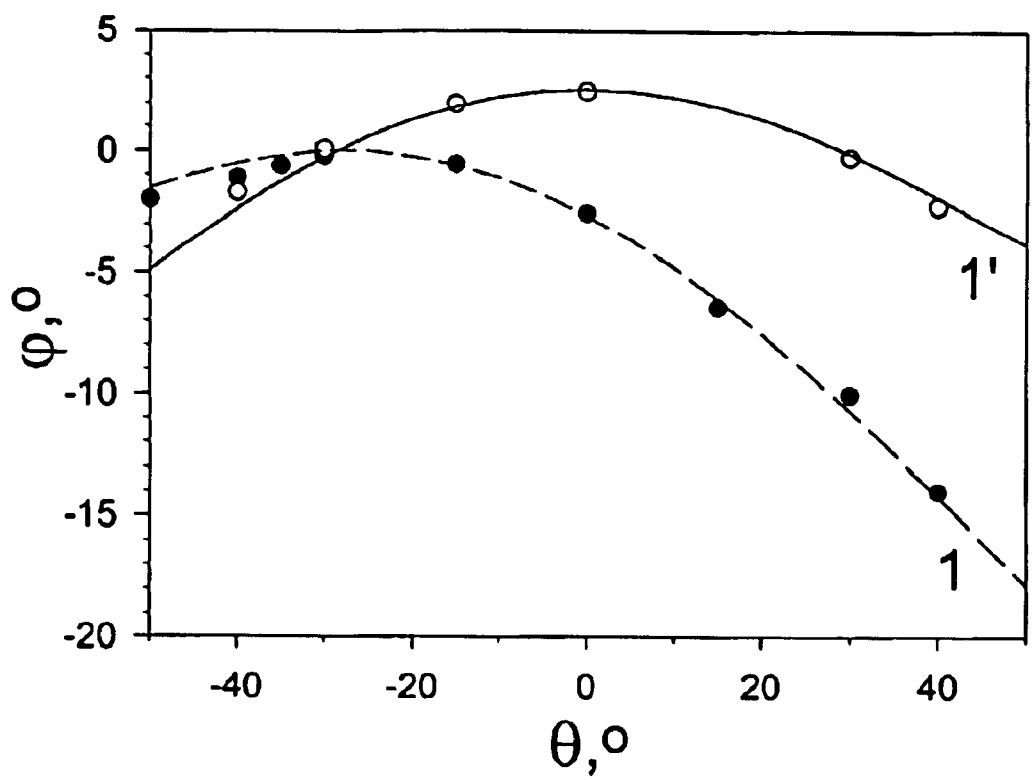
FIG. 7 presents $\phi$ versus $\theta$ curves measured for the film of azopolymer 2 obliquely irradiated with non-polarized UV light. The angle of light incidence is 45°.

The $\phi$ versus $\theta$ curves measured for the film of azopolymer 2 obliquely irradiated with UV light are presented in FIG. 7. The light incidence angle is 45°. The film was fitted within uniaxial model with the inclination of the optic axis of 19° from the film normal. The birefringence value $n_e - n_o$ was about 0.25.

The studies of orientational kinetics in the two types of polymers under polarized UV light irradiation indicated the differences in orientational behavior of the azobenzene fragments depending on chemical structure of main and side chains. The azobenzene fragments with polar groups retained their preferred in-plane alignment. Irradiation by polarized UV light induced planar alignment of the fragments in the direction perpendicular to the direction of light polarization. The azobenzene fragments with alkyl functional groups preferred the homeotropic alignment. Small in-plane birefringence induced by low dose polarized light was transient. The photosteady state for this polymer was characterized by highly ordered homeotropic alignment. Note that photo-steady state for both polymers was uniaxial. This uniaxiality could be connected with mesomorphic properties of the azobenzene fragments.

The illumination of the films of azopolymer 2 with polarized light induced fan-like structures with small in-plane birefringence and preferred out-of-plane alignment of the azobenzene fragments. The illumination of this polymer with high UV doses provided highly ordered homeotropic alignment featuring high out-of-plane birefringence. The irradiation of the films of azopolymer 1 with polarized light provided planar alignment of the azobenzene fragments in the direction perpendicular to the UV light polarization featuring high in-plane birefringence. The process of the induction of anisotropy had saturation behavior. The photosteady structures observed in both polymers were uniaxial.

Without being limited by, theory, the in-plane distribution of azobenzene fragments in azopolymer 1 can be explained by assuming in-plane alignment of the backbones and an interaction of the polar $NO_2$ group of the azobenzene moiety with the main chain fragments. The preferred homeotropic alignment of the azobenzene fragments of the azopolymer 2 may possibly be determined by the hydrophobic functional group at the end of the moiety and its weak interactions with the polymer backbones.

The irradiation of polymer films with polarized UV light at normal incidence induced in-plane birefringence and changed the relationship between the three principal refractive indices in both polymers.

Polyvinylcinnamate films.

Figure 8:
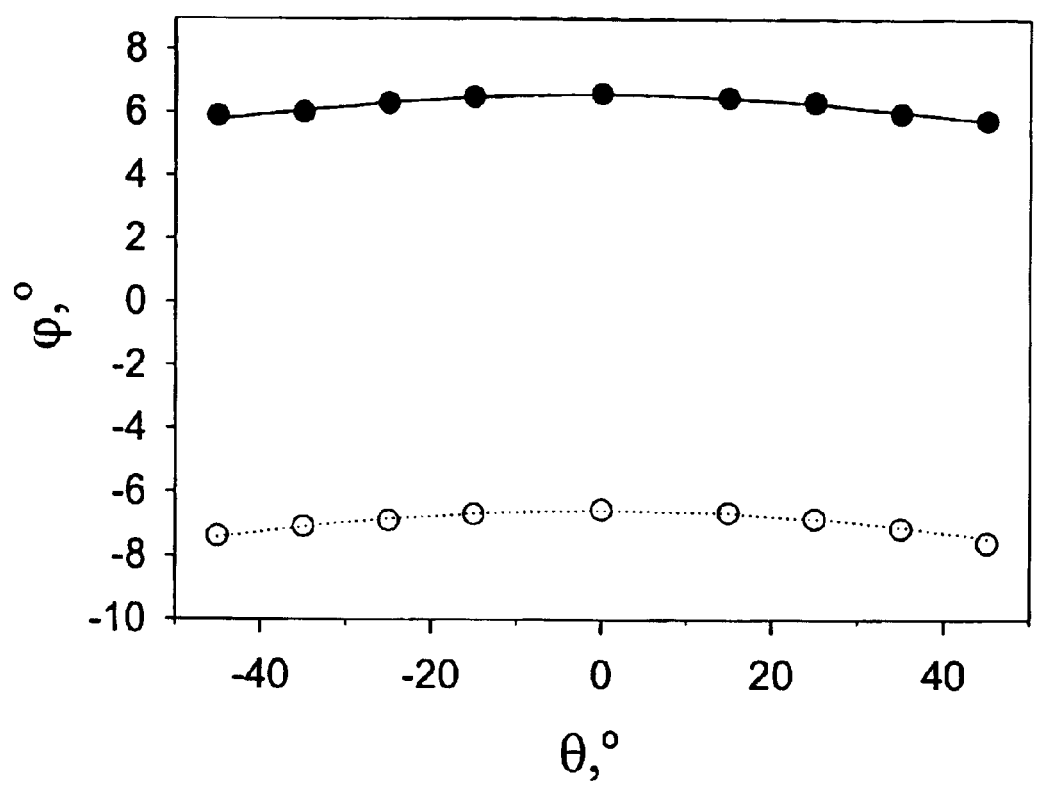
FIG. 8 presents $\phi(\theta)$ graphs for polyvinylcinnamate film irradiated with polarized UV light.

The $\phi(\theta)$ graphs for PVCN (FIG. 1$c$) film irradiated with polarized light are presented in FIG. 8. These curves were fitted well at the parameter set $(n_y - n_x) = 23$ nm, $(n_z - n_x) = 23$ nm, $(n_x < n_y = n_z)$ which corresponded to the model of negative A film.

The examples presented bellow classify the anisotropic structures which can be induced with the light in photosensitive polymers.

In one embodiment of the present invention, the optical axis of the optical compensation film OO' lies in the plane of the polymer film perpendicularly to the direction of the preferential light polarization. When the refractive index in the direction OO' is higher than in any other direction, 1≈OO' a positive A film is formed (FIG. 9$a$). When fabricating this film, the light beam is perpendicular or slantwise with respect to the plane of the polymer film. The light can be linearly polarized, elliptically polarized, or partially polarized. The film thickness is much less than the characteristic absorption length, i.e., the light intensity is constant in the film. The polymer material can possess any of the effects resulting in light-induced anisotropy. It can be reorientation of photosensitive fragments perpendicular to the polarization of actinic light and/or light-induced phototransformation of photosensitive fragments of polymer (decomposition, cross-linking, irreversible trans-cis isomerization etc).

The phenomenon of light induced anisotropy refers to materials having ability to show birefringence and dichroism when they are illuminated by actinic light. The parameters of the induced anisotropy depend on the irradiation conditions; direction of the induced axis of anisotropy depends on the direction of polarization of exciting light, while the value of the induced birefringence and dichroism on the irradiation dose.

In these conditions the direction of the anisotropy axis is determined by the direction of preferable polarization of light. In most cases the light-induced anisotropy axis is perpendicular to the polarization E (azobenzene, stilbene, cinnamate based polymers, polyimides). Some polyimide- and cinnamate-based materials provide anisotropy axis parallel to the polarization of light. The sign of birefringence is determined by chemical structure of the photosensitive fragments and the value of birefringence is given by the exposure time and light intensity.

EXAMPLE 1

Material

Structural formula of the material is given by

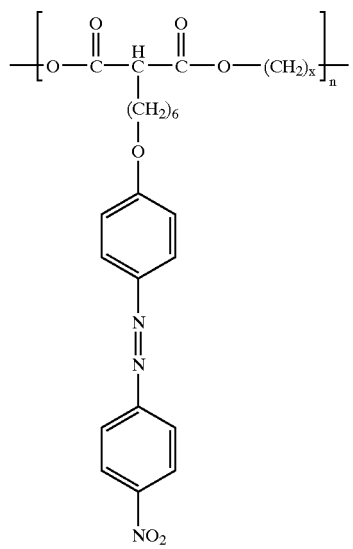

wherein x is a number from about 4 to about 16 and is a number from about 10 to about 1000. In this example, x is 8 and the average molecular weight is 13500 g/mol. Synthesis of this material is described in *Makromol. Chem.*, 194, 3341 (1993) by A. Böhme, E. Novotna, H. Kresse, F. Kuschel and J. Lindau. This polymer absorbs light with 1 less than about 500 nm due to an azobenzene chromophore contained in the side-chains of polymer molecules. When absorbing light, the azobenzen fragments undergo trans-cis isomerization accompanied with reorientation perpendicularly to the light polarization. An optical dipole moment of the trans isomer is oriented almost along its long axis.

Fabrication of the Polymer Film

The material above is dissolved in a dichloroethane (weight concentration of 40 g/l). A droplet of this solution is deposited on a rectangular glass substrate and spin-coated for 10 seconds at 2000 rpm. Then the substrate is maintained for 2 hours at 50° C. to remove the solvent. As a result, a uniform polymer film with a thickness of about 0.4 $\mu$m is produced on the substrate.

Irradiation of the polymer film:

The film was irradiated with the parallel beam of the polarized light from a Xe-lamp. The light beam was perpendicular to the plane of the polymer. Light intensity in the plane of the substrate was 20 mW/cm². The film was exposed for 15 min. The irradiation spectrum of the lamp overlaps the absorption spectrum of the polymer film.

Characteristics of the Film 3D structures in the films were characterized by null ellipsometry technique. These measurements showed uniaxial structure with orientation of the optical axis in the plane of the film perpendicularly with respect to the direction of light polarization, FIG. 9(a). The estimated in-plane, photo-induced birefringence was $n_y-n_x=0.3$.

Example 1a

Material

The same as in Example 1.

Fabrication of the Polymer Film

The same as in Example 1.

Irradiation of the Polymer Film

The film was irradiated normally to the film plane with the parallel beam of the partially polarized or elliptically polarized light from a Xe-lamp. The other conditions are the same as in Example 1.

Example 1b

Material

The same as in the Example 1.

Fabrication of the Polymer Film

The same as in the Example 1.

Irradiation of the Polymer Film

The film was irradiated in tilt position with respect to the film plane with the parallel beam of the polarized, partially polarized or elliptically polarized light from a Xe-lamp. The other conditions are the same as in Example 1.

In a second embodiment of the present invention, the uniaxial structure was induced when the optical axis OO' of the optical compensation film layed in the plane of the polymer film along the direction of the preferential light polarization, and $n_{OO'}<n_{l \neq OO'}$ (negative A film shown in FIG. 9(b)). When fabricating this film, the light beam was perpendicular to the plane of the polymer film. The light can be linearly polarized, elliptically polarized, or partially polarized. The film thickness was much less than the characteristic absorption length, i.e., the light intensity was constant in the film. The material possessed various effects, such as reorientation of photosensitive fragments perpendicular to the polarization of actinic light, and/or light-induced phototransformation of photosensitive fragments of polymer (decomposition, cross-linking, irreversible trans-cis isomerization etc) resulting in light-induced anisotropy.

EXAMPLE 2

Material

Structural formula of the material is given by.

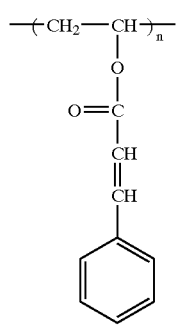

wherein n is a number from about 10 to about 1000. For this example, the average molecular weight was about 200,000. This polymer contains cynnamoyl groups in the side chains, which are capable for both (2+2') photocycloaddition and trans-cis isomerization under irradiation with actinic light.

Fabrication of the Polymer Film

The material was dissolved in dichloroethane at a weight concentration of 60 g/l. A droplet of this solution was deposited on a rectangular glass substrate and spin-coated for 10 seconds at 1500 rpm. The substrate was maintained at 70° C. for 2 hours to remove the solvent. A uniform polymer film with a thickness of about 1 μm was produced on the substrate.

Irradiation of the Polymer Film

The same as in Example 1.

Characteristic of the Film

The direction of the optical axis as well as the value of the induced birefringence in the film was determined by null ellipsometry technique. These measurements showed uniaxial structure with orientation of the optical axis in plane of the film in the direction of light polarization. Refractive index in the direction of the optical axes is less then in any other direction (FIG. 9b). Estimated in-plane photo-induced birefringence $n_y-n_x$ was as high as 0.01. This value is about an order of magnitude smaller than in Example 1.

Example 2a

Material

The same as in Example 2.

Fabrication of the Film

The same as in Example 2.

Irradiation of the Film

The film was irradiated in the tilt position with respect to the film plane with the parallel beam of the polarized, partially polarized, or elliptically polarized light from a Xe-lamp. The other conditions were the same as in Example 2.

Example 2b

Material

Structural formula of the material is given by

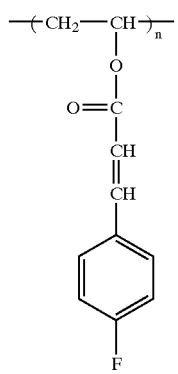

wherein n is a number from about 10 to about 1000. For this example, the molecular weight is 60,000.

Fabrication of the Polymer Film

The same as in Example 1.

Irradiation of the Polymer Film

The same as in Example 2.

Example 2c

Material

Mixture of two azopolymers with the structures shown below.

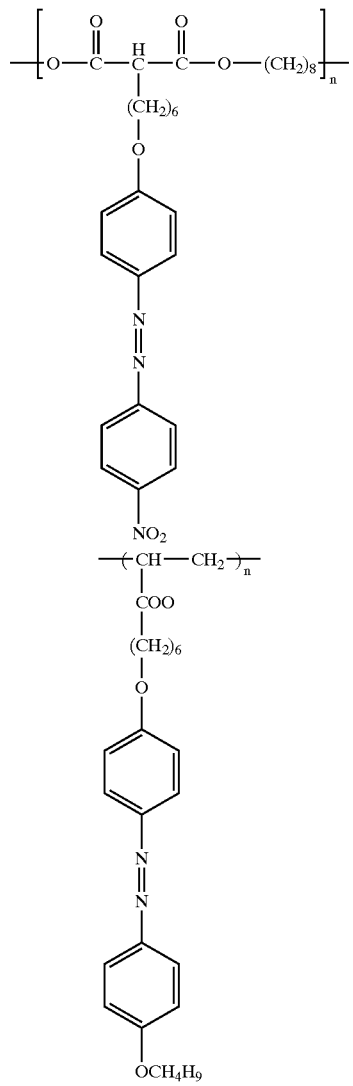

wherein each n is independently a number from about 10 to about 1000. For this example, the structure at the left had a molecular weight of about 13,500 g/mol, and the structure on the right had a molecular weight of about 36,000 g/mol. The proportion of the materials in the composition was 4:1 by weight based on the structure to the left to the structure at the right.

Fabrication of the Film

The same as in Example 1.

Irradiation of the Film

The same as in Example 1.

Characteristics of the Film

The photoinduced structure was a uniaxial negative A film. The in-plane birefringence was 0.12.

In a third embodiment, the uniaxial structure was induced when the optical axis of the optical compensation film OO' was perpendicular to the plane of the polymer film and $n_{OO'} > n_{OO'}$ (positive C film, FIG. 9(d)). When fabricating this film, the light beam was perpendicular to the plane of the polymer film. The actinic light was non-polarized or circularly polarized. The film thickness was much less than the characteristic absorption length, i.e., the light intensity was constant in the film. The irradiation resulted in the anisotropy axis perpendicular to the polymer surface. The value of light-induced birefringence depended on the exposure time and light intensity. The sign of birefringence depended on the photosensitive fragment structure.

EXAMPLE 3

Material

Structural formula of the material is given by

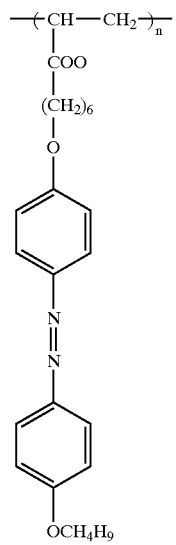

wherein n is a number from about 10 to about 1000. For this example, n was about 70.

Fabrication of the Polymer Film

The same as in Example 1.

Irradiation of the Polymer Film

The film was irradiated normally to the film plane with the parallel beam of the non-polarized light from a Xe-lamp. The intensity of the light 35 mW/cm². The other condition were the same as in Example 1.

Characteristics of the Film

The null ellipsometry technique showed uniaxial structure with orientation of the optic axis normally to the film; $n_e - n_0 = 0.25$.

Example 3a

Material
Structural formula of the material is given by

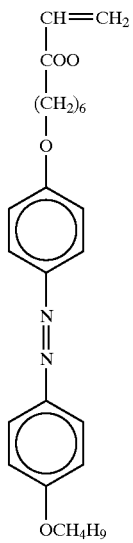

Photoinitiator Irgacure 369 from Ciba Additive, Inc. with a concentration of 10% by weight was added to the monomer in order to initiate polymerization of the material under irradiation with UV light. The prepared mixture was dissolved in dichloroethane at a concentration of 30 g/l.
Fabrication of the Polymer Film
   The same as in Example 1.
Irradiation of the Polymer Film
   The same as in Example 3.

Example 3b
Material
   Structural formula of the material is given by

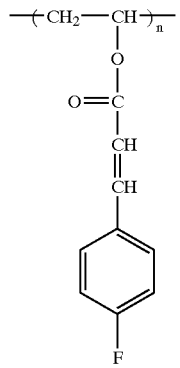

wherein n is a number from about 10 to about 1000. For this example, n was about 200.
Fabrication of the Polymer Film
   The same as in Example 1.
Irradiation of the Polymer Film
   The same as in Example 3.

In a fourth embodiment, the uniaxial structure was induced when the optical axis of the optical compensation film OO' was tilted to the plane of the polymer film and $n_{OO'} > n_{1_{OO'}}$ (positive O plate FIG. 9(e)). The optical axis being tilted to the plane of the polymer film can be formed as follows. Polymer film is irradiated obliquely with actinic light. Polarization of the light is non-polarized or circularly polarized, and polymer material possesses the effect of reorientation of photosensitive fragments perpendicular to the direction of light polarization, i.e. along the direction of light propagation in the film.

The optical axis being tilted to the plane of the polymer film can also be achieved as follows. Polymer film is irradiated obliquely with actinic light. The light is non-polarized or circularly polarized and the polymer material possess the effect of light-induced anisotropy due to photo-transformation of the polymer fragments (decomposition, cross-linking, irreversible trans-cis isomerization, etc.). In this case, photosensitive fragments that are oriented parallel to the direction of light propagation absorb light essentially weaker then that one oriented in other directions. The film thickness was much less than the characteristic absorption length, i.e., the light intensity was constant in the film.

In these case, generally, opical axis is induced in the direction parallel to the propagation direction of the light beam in the film, i.e. obliquely to the film plane. The sign of the light-induced birefringence depends on the photosensitive fragment structure and birefringence value is given by exposure and light intensity.

EXAMPLE 4

Material

Structural formula of the material is given by

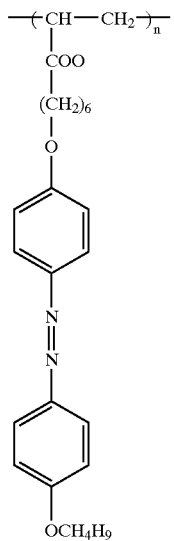

wherein n is a number from about 10 to about 1000. For this example, n was about 70.

Fabrication of the Polymer Film

The same as in the Example 1.

Irradiation of the Polymer Film

The film was irradiated in slope position with respect to the film plane with the parallel beam of the non-polarized light from a Xe-lamp. The angle between the light beam direction and the film plane was 45°. The other conditions are the same as in Example 1.

Characteristic of the Film

Film was investigated by null ellipsometry technique. It was described as uniaxial film with tilt position of the optic axis. The angle between film normal and direction of the optic axis is 19°; $n^e - n^o = 0.25$.

Example 4a

Material

Structural formula of the material is given by

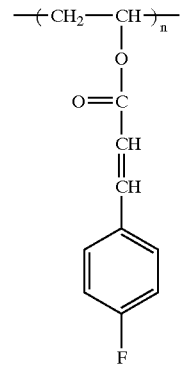

wherein n is a number from about 10 to about 1000. For this example, n was about 200.

Fabrication of the Polymer Film

The same as in Example 2.

Irradiation of the Polymer Film

The same as in Example 4.

Characteristics of the Film

After irradiation, the film was uniaxial with a tilt position of the optic axis. The angle between the film normal and direction of the optic axis was 22° and $n_e - n_o = 0.01$.

In a fifth embodiment, a biaxial structure was induced when $n_x < n_y < n_z$ (FIG. 9c)). When fabricating this film, the light beam was directed perpendicularly or obliquely to the plane of the polymer film. The actinic light was linearly, partially, or elliptically polarized. The film thickness was much less than the characteristic absorption length, i.e., the light intensity was constant in the film. The value of the light-induced birefringence depended on the exposure time and light intensity. The sign of birefringence depended on the photosensitive fragment structure.

EXAMPLE 5

Material

Structural formula of the material is given by

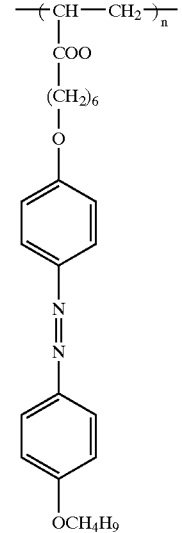

wherein n is a number from about 10 to about 1000. For this example, n was 70.

Fabrication of the Polymer Film
  The same as in Example 1.
Irradiation of the Polymer Film
  The same as in Example 1.
Characteristics of the Film
  After irradiation, the film was biaxial having in-plane birefringence $n_y-n_x=0.05$ and out of plane $n_z-n_x=0.1$ (FIG. 9(e)).

Example 5a

Material
  Structural formula of the material is given by

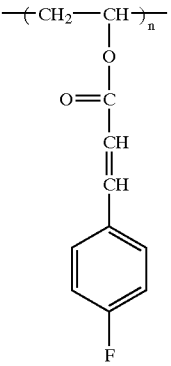

wherein n is a number from about 10 to about 1000. For this example, n was about 200.
Fabrication of the Polymer Film
  The same as in Example 2.
Irradiation of the Polymer Film
  The same as in Example 1, except that irradiation time was 60 min.
Characteristics of the Film
  After irradiation, the film was biaxial having in-plane birefringence $n_y-n_x=0.005$ and out of plane $n_z-n_x=0.007$ (FIG. 9(e)).

The invention is not limited to the examples presented above. More complicated orientation structures could be induced by the use of several irradiation steps. Each step would differ by polarization and incident conditions of the light.

The method of the present invention is useful for patterning of the compensation film. The structures described in Examples 1–5 could be realized in each series of the domains. The actinic light is non-polarized or polarized (linearly, partially, or elliptically), directed normally or obliquely depending on the desired structure in the domains. Patterned structures could be realized by the use of a mask system and multiple step irradiation.

Photo-modification of the structure of compensation film could be combined with the methods described earlier, for instance, mechanical treatment, alignment of LCs with aligning substrates, application of electrical or magnetic fields, and others.

Materials useful for the production of compensation films are not limited to the polymers and their corresponding monomers described in the examples above. Any material capable of acquiring anisotropic properties under irradiation may be capable for the fabrication of retardation films with the method described in the present invention.

The compensation layer could be coated on a separate substrate as well as on a substrate in a liquid crystal cell. The compensation film coated on the inner side of a substrate of a liquid crystal cell could simultaneously be used as an alignment layer for the liquid crystal cell.

It should be appreciated that the present invention is not limited to the specific embodiments described above, but includes variations, modifications and equivalent embodiments defined by the following claims.

What is claimed is:

1. An optical compensation film for a liquid crystal display comprising a polymer capable of producing light induced anisotropy characterized in that the polymer has a controlled in-plane and out-of-plane optical retardation, wherein the polymer is selected from the group consisting of polymers represented by the formulae:

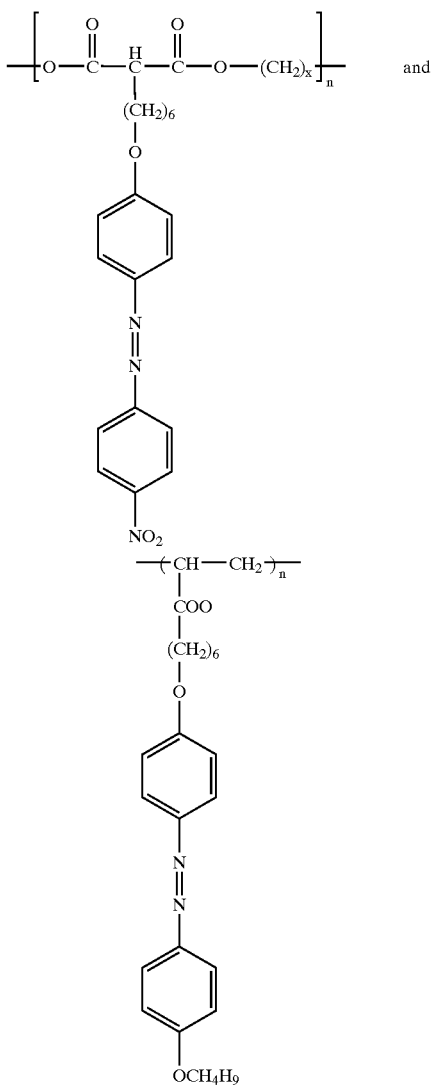

and mixtures thereof, wherein x is a number between about 4 and about 16, and wherein each n is independently a number from about 10 to about 1000.

2. The optical compensation film of claim 1, wherein the polymer has been irradiated with light that is at least one of linearly polarized light, elliptically polarized light, circularly polarized light, partially polarized light, and non-polarized light.

3. The optical compensation film of claim 1, wherein the polymer has been irradiated a plurality of times a wherein the light on subsequent irradiations has at least one of a different polarization and a different angle with respect to a plane formed by the film.

4. The optical compensation film of claim 1, wherein the film is a plane and has a biaxial structure, and the film has optical axes that are each one of oriented to the plane in one of lying in the plane of the film, perpendicular to the plane of the film, tilted to the plane of the film, and changing across the film, and wherein the optical axes are oriented different from each other.

5. A liquid crystal display comprising two opposed substrates, electrodes disposed on facing sides of the two opposed substrates, the optical compensation film of claim 1 disposed on at least one of the electrodes, and a liquid crystal disposed between the substrates.

6. The optical compensation film of claim 1, wherein the compensation film is selected from the group consisting of a negative A film, a positive A film, a positive C film and a positive O film.

7. An optical compensation film for a liquid crystal display comprising a polymer capable of producing light induced anisotropy characterized in that the polymer has a controlled in-plane and out-of-plane optical retardation, wherein the polymer is selected from the group consisting of polymers represented by the formulae:

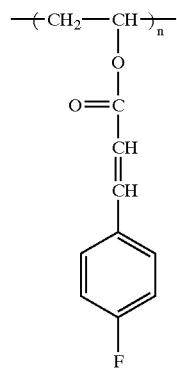

wherein n is a number from about 10 to about 1000.

8. The optical compensation film of claim 7, wherein the polymer has been irradiated with light that is at least one of linearly polarized list, elliptically polarized light, circularly polarized light, partially polarized light, and non-polarized light.

9. The optical compensation film of claim 7, wherein the polymer has been irradiated a plurality of times and wherein the light on subsequent irradiations has at least one of a different polarization and a different angle with respect to a plane formed by the film.

10. The optical compensation film of claim 7, wherein the film is a plane and has a biaxial structure, and the film has optical axes that are each one of oriented to the plane in one of lying in the plane of the film, perpendicular to the plane of the film, tilted to the plane of the film, and changing across the film, and wherein the optical axes are oriented different from each other.

11. A liquid optical display comprising two opposed substrates, electrodes disposed on facing sides of the two opposed substrates, the optical compensation film of claim 7 disposed on at least one of the electrodes, and a liquid crystal disposed between the substrates.

* * * * *